(12) United States Patent
Raciborski

(10) Patent No.: US 8,353,046 B2
(45) Date of Patent: Jan. 8, 2013

(54) SYSTEM AND METHOD FOR DELIVERY OF A MODULAR OPERATING SYSTEM

(75) Inventor: Bohdan Raciborski, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1108 days.

(21) Appl. No.: 11/147,539

(22) Filed: Jun. 8, 2005

(65) Prior Publication Data

US 2006/0282899 A1    Dec. 14, 2006

(51) Int. Cl.
*G06F 21/00* (2006.01)
(52) U.S. Cl. .............................. 726/26; 726/16; 380/231
(58) Field of Classification Search .................... 705/59, 705/64, 67, 52; 713/464, 173, 176, 180, 713/178, 167, 193; 719/321, 329; 717/126, 717/168; 715/781; 726/26, 1, 6, 17; 380/231–233; 711/6
See application file for complete search history.

(56) References Cited

U.S. PATENT DOCUMENTS

| | | | |
|---|---|---|---|
| 4,558,176 A | 12/1985 | Arnold et al. | |
| 4,620,150 A | 10/1986 | Germer et al. | |
| 4,750,034 A | 6/1988 | Lem | |
| 4,817,094 A | 3/1989 | Lebizay et al. | |
| 4,855,730 A | 8/1989 | Venners et al. | |
| 4,855,922 A | 8/1989 | Huddleston et al. | |
| 4,857,999 A | 8/1989 | Welsh | |
| 4,910,692 A | 3/1990 | Outram et al. | |
| 4,959,774 A | 9/1990 | Davis | |
| 4,967,273 A | 10/1990 | Greenberg | |
| 5,001,752 A | 3/1991 | Fischer | |
| 5,012,514 A | 4/1991 | Renton | |
| 5,249,184 A | 9/1993 | Woest et al. | |
| 5,269,019 A | 12/1993 | Peterson et al. | |
| 5,274,368 A | 12/1993 | Breeden et al. | |
| 5,301,268 A * | 4/1994 | Takeda | ........................ 719/329 |
| 5,355,161 A | 10/1994 | Bird et al. | |
| 5,369,262 A | 11/1994 | Dvorkis et al. | |
| 5,406,630 A | 4/1995 | Piosenka et al. | |
| 5,414,861 A | 5/1995 | Horning | |
| 5,437,040 A | 7/1995 | Campbell | |
| 5,442,704 A | 8/1995 | Holtey | |
| 5,448,045 A | 9/1995 | Clark | |
| 5,459,867 A * | 10/1995 | Adams et al. | ................. 719/321 |

(Continued)

FOREIGN PATENT DOCUMENTS

CN    1531673    9/2004

(Continued)

OTHER PUBLICATIONS

Specification of U.S. Appl. No. 10/989,907, filed Nov. 15, 2004.

(Continued)

*Primary Examiner* — Justin T Darrow

(57) ABSTRACT

An operating system and method for use include a core function module, or basic kernel, providing fundamental operating system support and one or more add-on modules that allow customization of the operating system as desired. Add-on modules may provide support or extended capability to the computer including hardware, applications, peripherals, and support. A digital signature may be used to confirm the integrity of an add-on module prior to installation. Certification may be verified to determine if installation of the add-on module is authorized. By withholding certification, a service provider may manage illegal or undesired modifications to a provided computer. Digital rights management may be used to enforce terms of use of the add-on module in keeping with licensing arrangements.

19 Claims, 6 Drawing Sheets

U.S. PATENT DOCUMENTS

| | | | |
|---|---|---|---|
| 5,473,692 A | 12/1995 | Davis | |
| 5,490,216 A | 2/1996 | Richardson, III | |
| 5,500,897 A | 3/1996 | Hartman, Jr. | |
| 5,513,319 A | 4/1996 | Finch et al. | |
| 5,522,040 A | 5/1996 | Hofsass et al. | |
| 5,530,846 A | 6/1996 | Strong | |
| 5,552,776 A | 9/1996 | Wade et al. | |
| 5,563,799 A | 10/1996 | Brehmer et al. | |
| 5,568,552 A | 10/1996 | Davis | |
| 5,586,291 A | 12/1996 | Lasker et al. | |
| 5,671,412 A | 9/1997 | Christiano | |
| 5,710,706 A | 1/1998 | Markl et al. | |
| 5,715,403 A * | 2/1998 | Stefik | 705/44 |
| 5,724,425 A | 3/1998 | Chang et al. | |
| 5,745,879 A | 4/1998 | Wyman | |
| 5,754,763 A | 5/1998 | Bereiter | |
| 5,758,068 A | 5/1998 | Brandt et al. | |
| 5,763,832 A | 6/1998 | Anselm | |
| 5,768,382 A | 6/1998 | Schneier et al. | |
| 5,771,354 A | 6/1998 | Crawford | |
| 5,774,870 A | 6/1998 | Storey | |
| 5,793,839 A | 8/1998 | Farris et al. | |
| 5,802,592 A | 9/1998 | Chess et al. | |
| 5,825,883 A | 10/1998 | Archibald et al. | |
| 5,841,865 A | 11/1998 | Sudia | |
| 5,844,986 A | 12/1998 | Davis | |
| 5,845,065 A | 12/1998 | Conte et al. | |
| 5,875,236 A | 2/1999 | Jankowitz et al. | |
| 5,883,670 A | 3/1999 | Sporer et al. | |
| 5,892,906 A | 4/1999 | Chou et al. | |
| 5,925,127 A | 7/1999 | Ahmad | |
| 5,948,061 A | 9/1999 | Merriman | |
| 5,953,502 A | 9/1999 | Helbig et al. | |
| 5,956,408 A | 9/1999 | Arnold | |
| 5,983,238 A | 11/1999 | Becker et al. | |
| 5,994,710 A | 11/1999 | Knee et al. | |
| 6,021,438 A | 2/2000 | Duvvoori | |
| 6,026,293 A | 2/2000 | Osborn | |
| 6,049,789 A | 4/2000 | Frison et al. | |
| 6,061,794 A | 5/2000 | Angelo et al. | |
| 6,078,909 A | 6/2000 | Knutson | |
| 6,101,606 A | 8/2000 | Diersch et al. | |
| 6,119,229 A | 9/2000 | Martinez et al. | |
| 6,147,773 A | 11/2000 | Taylor | |
| 6,148,417 A | 11/2000 | Da Silva | |
| 6,158,657 A | 12/2000 | Hall, III et al. | |
| 6,185,678 B1 | 2/2001 | Arbaugh et al. | |
| 6,188,995 B1 * | 2/2001 | Garst et al. | 705/59 |
| 6,189,146 B1 | 2/2001 | Misra et al. | |
| 6,192,392 B1 * | 2/2001 | Ginter | 709/203 |
| 6,219,652 B1 | 4/2001 | Carter et al. | |
| 6,223,291 B1 | 4/2001 | Puhl | |
| 6,226,747 B1 | 5/2001 | Larsson et al. | |
| 6,230,185 B1 | 5/2001 | Salas et al. | |
| 6,233,600 B1 | 5/2001 | Salas et al. | |
| 6,233,685 B1 | 5/2001 | Smith et al. | |
| 6,243,439 B1 | 6/2001 | Arai et al. | |
| 6,253,224 B1 | 6/2001 | Brice, Jr. et al. | |
| 6,263,431 B1 | 7/2001 | Lovelace et al. | |
| 6,272,469 B1 | 8/2001 | Koritzinsky et al. | |
| 6,279,111 B1 | 8/2001 | Jensenworth et al. | |
| 6,279,156 B1 | 8/2001 | Amberg et al. | |
| 6,286,051 B1 | 9/2001 | Becker et al. | |
| 6,289,319 B1 | 9/2001 | Lockwood et al. | |
| 6,295,577 B1 | 9/2001 | Anderson et al. | |
| 6,303,924 B1 | 10/2001 | Adan et al. | |
| 6,314,408 B1 | 11/2001 | Salas et al. | |
| 6,314,409 B2 | 11/2001 | Schneck et al. | |
| 6,321,335 B1 | 11/2001 | Chu | |
| 6,327,652 B1 * | 12/2001 | England et al. | 713/2 |
| 6,330,670 B1 * | 12/2001 | England et al. | 713/2 |
| 6,334,189 B1 | 12/2001 | Granger et al. | |
| 6,345,294 B1 | 2/2002 | O'Toole et al. | |
| 6,363,488 B1 * | 3/2002 | Ginter et al. | 726/1 |
| 6,367,017 B1 | 4/2002 | Gray | |
| 6,373,047 B1 | 4/2002 | Adan et al. | |
| 6,385,727 B1 | 5/2002 | Cassagnol et al. | |
| 6,405,923 B1 | 6/2002 | Seysen | |
| 6,408,170 B1 | 6/2002 | Schmidt et al. | |
| 6,411,941 B1 | 6/2002 | Mullor et al. | |
| 6,424,714 B1 | 7/2002 | Wasilewski et al. | |
| 6,441,813 B1 | 8/2002 | Ishibashi | |
| 6,442,529 B1 | 8/2002 | Krishan et al. | |
| 6,442,690 B1 | 8/2002 | Howard, Jr. et al. | |
| 6,460,140 B1 | 10/2002 | Schoch et al. | |
| 6,463,534 B1 | 10/2002 | Geiger et al. | |
| 6,496,858 B1 | 12/2002 | Frailong et al. | |
| 6,567,793 B1 | 5/2003 | Hicks et al. | |
| 6,571,216 B1 | 5/2003 | Garg et al. | |
| 6,585,158 B2 | 7/2003 | Norskog | |
| 6,587,684 B1 | 7/2003 | Hsu et al. | |
| 6,609,201 B1 | 8/2003 | Folmsbee | |
| 6,625,729 B1 | 9/2003 | Angelo | |
| 6,631,478 B1 | 10/2003 | Wang et al. | |
| 6,646,244 B2 | 11/2003 | Aas et al. | |
| 6,664,948 B2 | 12/2003 | Crane et al. | |
| 6,671,803 B1 | 12/2003 | Pasieka | |
| 6,678,828 B1 | 1/2004 | Pham et al. | |
| 6,690,556 B2 | 2/2004 | Smola et al. | |
| 6,694,000 B2 | 2/2004 | Ung et al. | |
| 6,704,873 B1 | 3/2004 | Underwood | |
| 6,708,176 B2 | 3/2004 | Strunk et al. | |
| 6,716,652 B1 | 4/2004 | Ortlieb | |
| 6,738,810 B1 | 5/2004 | Kramer et al. | |
| 6,763,458 B1 | 7/2004 | Watanabe | |
| 6,791,157 B1 | 9/2004 | Casto et al. | |
| 6,816,809 B2 | 11/2004 | Circenis | |
| 6,816,900 B1 | 11/2004 | Vogel et al. | |
| 6,834,352 B2 | 12/2004 | Shin | |
| 6,839,841 B1 | 1/2005 | Medvinsky et al. | |
| 6,844,871 B1 | 1/2005 | Hinckley et al. | |
| 6,847,942 B1 | 1/2005 | Land et al. | |
| 6,851,051 B1 | 2/2005 | Bolle et al. | |
| 6,868,433 B1 | 3/2005 | Philyaw | |
| 6,871,283 B1 | 3/2005 | Zurko et al. | |
| 6,920,567 B1 | 7/2005 | Doherty et al. | |
| 6,934,942 B1 | 8/2005 | Chilimbi | |
| 6,954,728 B1 | 10/2005 | Kusumoto et al. | |
| 6,957,186 B1 * | 10/2005 | Guheen et al. | 705/323 |
| 6,976,162 B1 | 12/2005 | Ellison et al. | |
| 6,983,050 B1 | 1/2006 | Yacobi et al. | |
| 6,986,042 B2 | 1/2006 | Griffin | |
| 6,990,174 B2 | 1/2006 | Eskelinen | |
| 6,993,648 B2 | 1/2006 | Goodman et al. | |
| 7,000,100 B2 | 2/2006 | Lacombe et al. | |
| 7,000,829 B2 | 2/2006 | Harris et al. | |
| 7,013,384 B2 | 3/2006 | Challener et al. | |
| 7,028,149 B2 | 4/2006 | Grawrock et al. | |
| 7,052,530 B2 | 5/2006 | Edlund et al. | |
| 7,054,468 B2 | 5/2006 | Yang | |
| 7,069,442 B2 | 6/2006 | Sutton, II | |
| 7,069,595 B2 | 6/2006 | Cognigni et al. | |
| 7,076,652 B2 | 7/2006 | Ginter et al. | |
| 7,096,469 B1 | 8/2006 | Kubala et al. | |
| 7,097,357 B2 | 8/2006 | Johnson et al. | |
| 7,103,574 B1 | 9/2006 | Peinado et al. | |
| 7,113,912 B2 | 9/2006 | Stefik | |
| 7,117,183 B2 | 10/2006 | Blair et al. | |
| 7,121,460 B1 | 10/2006 | Parsons et al. | |
| 7,127,579 B2 | 10/2006 | Zimmer et al. | |
| 7,130,951 B1 | 10/2006 | Christie et al. | |
| 7,143,297 B2 | 11/2006 | Buchheit et al. | |
| 7,162,645 B2 | 1/2007 | Iguchi et al. | |
| 7,171,539 B2 | 1/2007 | Mansell et al. | |
| 7,174,457 B1 | 2/2007 | England et al. | |
| 7,207,039 B2 | 4/2007 | Komarla et al. | |
| 7,234,144 B2 | 6/2007 | Wilt et al. | |
| 7,236,455 B1 | 6/2007 | Proudler et al. | |
| 7,669,056 B2 | 6/2007 | Frank | |
| 7,266,569 B2 | 9/2007 | Cutter et al. | |
| 7,299,358 B2 | 11/2007 | Chateau et al. | |
| 7,353,402 B2 | 4/2008 | Bourne et al. | |
| 7,356,709 B2 | 4/2008 | Gunyakti et al. | |
| 7,359,807 B2 | 4/2008 | Frank et al. | |
| 7,360,253 B2 | 4/2008 | Frank et al. | |
| 7,392,429 B2 | 6/2008 | Westeronen et al. | |
| 7,395,245 B2 | 7/2008 | Okamoto et al. | |

| | | | | | | |
|---|---|---|---|---|---|---|
| 7,395,452 B2 | 7/2008 | Nicholson et al. | | 2003/0163712 A1 | 8/2003 | LaMothe et al. |
| 7,406,446 B2 | 7/2008 | Frank et al. | | 2003/0172376 A1 | 9/2003 | Coffin, III et al. |
| 7,421,413 B2 | 9/2008 | Frank et al. | | 2003/0185395 A1 | 10/2003 | Lee et al. |
| 7,441,121 B2 | 10/2008 | Cutter, Jr. et al. | | 2003/0188165 A1 | 10/2003 | Sutton et al. |
| 7,441,246 B2 * | 10/2008 | Auerbach et al. ............. 719/310 | | 2003/0196102 A1 | 10/2003 | McCarroll |
| 7,461,249 B1 * | 12/2008 | Pearson et al. ................. 713/156 | | 2003/0196106 A1 | 10/2003 | Erfani et al. |
| 7,464,103 B2 | 12/2008 | Siu | | 2003/0208338 A1 | 11/2003 | Challener et al. |
| 7,490,356 B2 | 2/2009 | Lieblich et al. | | 2003/0208573 A1 | 11/2003 | Harrison et al. |
| 7,493,487 B2 | 2/2009 | Phillips et al. | | 2003/0229702 A1 | 12/2003 | Hensbergen et al. |
| 7,494,277 B2 | 2/2009 | Setala | | 2004/0001088 A1 | 1/2004 | Stancil et al. |
| 7,519,816 B2 | 4/2009 | Phillips et al. | | 2004/0003190 A1 | 1/2004 | Childs et al. |
| 7,539,863 B2 | 5/2009 | Phillips et al. | | 2004/0003288 A1 | 1/2004 | Wiseman et al. |
| 7,549,060 B2 | 6/2009 | Bourne et al. | | 2004/0010440 A1 | 1/2004 | Lenard et al. |
| 7,562,220 B2 | 7/2009 | Frank et al. | | 2004/0019456 A1 | 1/2004 | Cirenis |
| 7,565,325 B2 | 7/2009 | Lenard | | 2004/0023636 A1 | 2/2004 | Gurel et al. |
| 7,568,096 B2 | 7/2009 | Evans | | 2004/0030912 A1 | 2/2004 | Merkle, Jr. et al. |
| 7,596,784 B2 | 9/2009 | Abrams | | 2004/0034816 A1 | 2/2004 | Richard |
| 7,610,631 B2 | 10/2009 | Frank et al. | | 2004/0039916 A1 | 2/2004 | Aldis et al. |
| 7,644,239 B2 | 1/2010 | Westerinen et al. | | 2004/0039924 A1 | 2/2004 | Baldwin et al. |
| 7,694,153 B2 | 4/2010 | Ahdout | | 2004/0039960 A1 | 2/2004 | Kassayan |
| 7,770,205 B2 | 8/2010 | Frank | | 2004/0044629 A1 | 3/2004 | Rhodes et al. |
| 7,814,532 B2 | 10/2010 | Cromer et al. | | 2004/0054907 A1 | 3/2004 | Chateau et al. |
| 7,877,607 B2 | 1/2011 | Circenis | | 2004/0054908 A1 | 3/2004 | Circenis et al. |
| 7,669,056 C1 | 2/2011 | Frank et al. | | 2004/0054909 A1 | 3/2004 | Serkowski et al. |
| 7,891,007 B2 | 2/2011 | Waxman et al. | | 2004/0059937 A1 | 3/2004 | Nakano |
| 7,958,029 B1 | 6/2011 | Bobich et al. | | 2004/0064707 A1 | 4/2004 | McCann et al. |
| 7,979,721 B2 | 7/2011 | Westerinen et al. | | 2004/0067746 A1 | 4/2004 | Johnson |
| 2001/0034711 A1 | 10/2001 | Tashenberg | | 2004/0073670 A1 | 4/2004 | Chack et al. |
| 2001/0056413 A1 | 12/2001 | Suzuki et al. | | 2004/0088548 A1 | 5/2004 | Smetters et al. |
| 2001/0056539 A1 | 12/2001 | Pavlin et al. | | 2004/0093371 A1 | 5/2004 | Burrows et al. |
| 2002/0002597 A1 | 1/2002 | Morrell, Jr. | | 2004/0093508 A1 | 5/2004 | Foerstner et al. |
| 2002/0007310 A1 | 1/2002 | Long | | 2004/0107359 A1 | 6/2004 | Kawano et al. |
| 2002/0023212 A1 | 2/2002 | Proudler | | 2004/0107368 A1 | 6/2004 | Colvin |
| 2002/0046098 A1 | 4/2002 | Maggio | | 2004/0123127 A1 | 6/2004 | Teicher et al. |
| 2002/0055906 A1 | 5/2002 | Katz et al. | | 2004/0125755 A1 | 7/2004 | Roberts |
| 2002/0091569 A1 | 7/2002 | Kitaura et al. | | 2004/0128251 A1 | 7/2004 | Adam et al. |
| 2002/0107701 A1 | 8/2002 | Batty et al. | | 2004/0133794 A1 * | 7/2004 | Kocher et al. ................... 713/193 |
| 2002/0111916 A1 | 8/2002 | Coronna et al. | | 2004/0139027 A1 | 7/2004 | Molaro |
| 2002/0112171 A1 | 8/2002 | Ginter et al. | | 2004/0193919 A1 | 9/2004 | Dabbish et al. |
| 2002/0123964 A1 | 9/2002 | Kramer et al. | | 2004/0199769 A1 | 10/2004 | Proudler |
| 2002/0124212 A1 | 9/2002 | Nitschke et al. | | 2004/0220858 A1 | 11/2004 | Maggio |
| 2002/0129359 A1 | 9/2002 | Lichner | | 2004/0225894 A1 | 11/2004 | Colvin |
| 2002/0138549 A1 | 9/2002 | Urien | | 2004/0255000 A1 | 12/2004 | Simionescu et al. |
| 2002/0141451 A1 | 10/2002 | Gates et al. | | 2004/0268120 A1 | 12/2004 | Mirtal et al. |
| 2002/0144131 A1 | 10/2002 | Spacey | | 2005/0015343 A1 | 1/2005 | Nagai et al. |
| 2002/0147601 A1 | 10/2002 | Fagan | | 2005/0021944 A1 | 1/2005 | Craft et al. |
| 2002/0147782 A1 | 10/2002 | Dimitrova et al. | | 2005/0028000 A1 | 2/2005 | Bulusu et al. |
| 2002/0147912 A1 | 10/2002 | Shmueli et al. | | 2005/0033747 A1 | 2/2005 | Wittkotter |
| 2002/0178071 A1 | 11/2002 | Walker et al. | | 2005/0039013 A1 | 2/2005 | Bajikar et al. |
| 2002/0184482 A1 | 12/2002 | Lacombe et al. | | 2005/0044197 A1 | 2/2005 | Lai |
| 2002/0184508 A1 | 12/2002 | Bialick et al. | | 2005/0050355 A1 | 3/2005 | Graunke |
| 2002/0193101 A1 | 12/2002 | McAlinden | | 2005/0060388 A1 | 3/2005 | Tatsumi et al. |
| 2002/0194132 A1 | 12/2002 | Pearson et al. | | 2005/0065880 A1 | 3/2005 | Amato et al. |
| 2003/0005135 A1 | 1/2003 | Inoue et al. | | 2005/0080701 A1 | 4/2005 | Tunney et al. |
| 2003/0014323 A1 | 1/2003 | Scheer | | 2005/0091104 A1 | 4/2005 | Abraham |
| 2003/0027549 A1 | 2/2003 | Kiel et al. | | 2005/0097204 A1 | 5/2005 | Horowitz et al. |
| 2003/0028454 A1 | 2/2003 | Ooho | | 2005/0102181 A1 | 5/2005 | Scroggie et al. |
| 2003/0035409 A1 | 2/2003 | Wang et al. | | 2005/0108547 A1 | 5/2005 | Sakai |
| 2003/0037246 A1 | 2/2003 | Goodman et al. | | 2005/0108564 A1 | 5/2005 | Freeman et al. |
| 2003/0040960 A1 | 2/2003 | Eckmann | | 2005/0120251 A1 | 6/2005 | Fukumori |
| 2003/0046026 A1 | 3/2003 | Levy et al. | | 2005/0125673 A1 | 6/2005 | Cheng et al. |
| 2003/0048473 A1 | 3/2003 | Rosen | | 2005/0129296 A1 | 6/2005 | Setala |
| 2003/0056107 A1 | 3/2003 | Cammack et al. | | 2005/0132150 A1 | 6/2005 | Jewell et al. |
| 2003/0084278 A1 | 5/2003 | Cromer et al. | | 2005/0138370 A1 | 6/2005 | Goud et al. |
| 2003/0084285 A1 | 5/2003 | Cromer et al. | | 2005/0138389 A1 | 6/2005 | Catherman et al. |
| 2003/0084337 A1 | 5/2003 | Simionescu et al. | | 2005/0138423 A1 | 6/2005 | Ranganathan |
| 2003/0084352 A1 | 5/2003 | Schwartz et al. | | 2005/0141717 A1 | 6/2005 | Cromer et al. |
| 2003/0088500 A1 | 5/2003 | Shinohara et al. | | 2005/0144099 A1 | 6/2005 | Deb et al. |
| 2003/0093694 A1 | 5/2003 | Medvinsky et al. | | 2005/0166051 A1 | 7/2005 | Buer |
| 2003/0097596 A1 | 5/2003 | Muratov et al. | | 2005/0182921 A1 | 8/2005 | Duncan |
| 2003/0110388 A1 | 6/2003 | Pavlin et al. | | 2005/0182940 A1 | 8/2005 | Sutton |
| 2003/0115458 A1 | 6/2003 | Song | | 2005/0188843 A1 | 9/2005 | Edlund et al. |
| 2003/0126519 A1 | 7/2003 | Odorcic | | 2005/0203801 A1 | 9/2005 | Morgenstern et al. |
| 2003/0131252 A1 | 7/2003 | Barton et al. | | 2005/0213761 A1 | 9/2005 | Walmsley et al. |
| 2003/0135380 A1 | 7/2003 | Lehr et al. | | 2005/0216577 A1 | 9/2005 | Durham et al. |
| 2003/0149671 A1 | 8/2003 | Yamamoto et al. | | 2005/0221766 A1 | 10/2005 | Brizek et al. |
| 2003/0156572 A1 | 8/2003 | Hui et al. | | 2005/0235141 A1 | 10/2005 | Ibrahim et al. |
| 2003/0156719 A1 | 8/2003 | Cronce | | 2005/0240533 A1 | 10/2005 | Cutter et al. |
| 2003/0163383 A1 | 8/2003 | Engelhart | | 2005/0246521 A1 | 11/2005 | Bade et al. |

| | | | | | | |
|---|---|---|---|---|---|---|
| 2005/0246525 | A1 | 11/2005 | Bade et al. | JP | 2002108478 | 4/2002 |
| 2005/0246552 | A1 | 11/2005 | Bade et al. | JP | 2002108870 | 4/2002 |
| 2005/0257073 | A1 | 11/2005 | Bade et al. | JP | 2002374327 | 12/2002 |
| 2005/0275866 | A1 | 12/2005 | Corlett | JP | 2003507785 | 2/2003 |
| 2005/0278519 | A1 | 12/2005 | Luebke et al. | JP | 2003140761 | 5/2003 |
| 2005/0279827 | A1 | 12/2005 | Mascavage et al. | JP | 2003140762 | 5/2003 |
| 2005/0286476 | A1 | 12/2005 | Crosswy et al. | JP | 2003157335 | 5/2003 |
| 2005/0289177 | A1* | 12/2005 | Hohmann et al. ........ 707/103 R | JP | 2003208314 | 7/2003 |
| 2005/0289343 | A1 | 12/2005 | Tahan | JP | 2003248522 | 9/2003 |
| 2006/0010326 | A1 | 1/2006 | Bade et al. | JP | 2003296487 | 10/2003 |
| 2006/0015717 | A1 | 1/2006 | Liu et al. | JP | 2002182562 | 1/2004 |
| 2006/0015718 | A1 | 1/2006 | Liu et al. | JP | 2004062561 | 2/2004 |
| 2006/0015732 | A1 | 1/2006 | Liu | JP | 2004118327 | 4/2004 |
| 2006/0020784 | A1 | 1/2006 | Jonker et al. | JP | 2004164491 | 6/2004 |
| 2006/0026418 | A1 | 2/2006 | Bade | JP | 2004295846 | 10/2004 |
| 2006/0026419 | A1 | 2/2006 | Arndt et al. | JP | 2004304755 | 10/2004 |
| 2006/0026422 | A1 | 2/2006 | Bade et al. | JP | 2007525774 | 9/2007 |
| 2006/0055506 | A1 | 3/2006 | Nicolas | JP | H08-054952 | 2/2011 |
| 2006/0072748 | A1 | 4/2006 | Buer | KR | 20010000805 | 1/2001 |
| 2006/0072762 | A1 | 4/2006 | Buer | KR | 20020037453 | 5/2002 |
| 2006/0074600 | A1 | 4/2006 | Sastry et al. | KR | 20050008439 | 1/2005 |
| 2006/0075014 | A1 | 4/2006 | Tharappel et al. | KR | 20050021782 | 3/2005 |
| 2006/0075223 | A1 | 4/2006 | Bade et al. | WO | WO-9721162 | 6/1997 |
| 2006/0085634 | A1 | 4/2006 | Jain | WO | WO-9811478 | 3/1998 |
| 2006/0085637 | A1 | 4/2006 | Pinkas | WO | WO-0054126 | 9/2000 |
| 2006/0085844 | A1 | 4/2006 | Buer et al. | WO | WO-0135293 | 5/2001 |
| 2006/0089917 | A1 | 4/2006 | Strom et al. | WO | WO-0145012 | 6/2001 |
| 2006/0090084 | A1 | 4/2006 | Buer | WO | WO-0163512 | 8/2001 |
| 2006/0100010 | A1* | 5/2006 | Gatto et al. ...................... 463/29 | WO | WO-0177795 | 10/2001 |
| 2006/0106845 | A1 | 5/2006 | Frank et al. | WO | WO-0193461 | 12/2001 |
| 2006/0106920 | A1 | 5/2006 | Steeb et al. | WO | WO-0208969 | 1/2002 |
| 2006/0107306 | A1 | 5/2006 | Thirumalai et al. | WO | WO-02056155 | 7/2002 |
| 2006/0107328 | A1 | 5/2006 | Frank et al. | WO | WO-02103495 | 12/2002 |
| 2006/0107335 | A1 | 5/2006 | Frank et al. | WO | WO-03009115 | 1/2003 |
| 2006/0112267 | A1 | 5/2006 | Zimmer et al. | WO | WO-03030434 | 4/2003 |
| 2006/0117177 | A1 | 6/2006 | Buer | WO | WO-03073688 | 9/2003 |
| 2006/0129824 | A1 | 6/2006 | Hoff et al. | WO | WO-03107585 | 12/2003 |
| 2006/0130130 | A1 | 6/2006 | Kablotsky | WO | WO-03107588 | 12/2003 |
| 2006/0143431 | A1 | 6/2006 | Rothman | WO | WO-2004092886 | 10/2004 |
| 2006/0165005 | A1 | 7/2006 | Frank et al. | WO | WO-2007032974 | 3/2007 |
| 2006/0168664 | A1 | 7/2006 | Frank et al. | | | |
| 2006/0206618 | A1 | 9/2006 | Zimmer et al. | | | |
| 2006/0213997 | A1 | 9/2006 | Frank et al. | | | |
| 2006/0282319 | A1 | 12/2006 | Maggio | | | |
| 2006/0282899 | A1* | 12/2006 | Raciborski ...................... 726/26 | | | |
| 2007/0033102 | A1 | 2/2007 | Frank et al. | | | |
| 2007/0280422 | A1 | 12/2007 | Setala | | | |
| 2009/0070454 | A1 | 3/2009 | McKinnon, III et al. | | | |
| 2012/0137127 | A1 | 5/2012 | Jain | | | |

FOREIGN PATENT DOCUMENTS

| | | |
|---|---|---|
| EP | 0635790 | 1/1995 |
| EP | 0843449 | 5/1998 |
| EP | 1061465 | 12/2000 |
| EP | 1085396 | 3/2001 |
| EP | 1387237 | 2/2004 |
| EP | 1429224 | 6/2004 |
| EP | 1223722 | 8/2004 |
| EP | 1460514 | 9/2004 |
| EP | 1233337 | 8/2005 |
| GB | 2359969 | 9/2001 |
| GB | 2378780 | 2/2003 |
| JP | H0535461 | 2/1993 |
| JP | H0635718 | 2/1994 |
| JP | H07036559 | 2/1995 |
| JP | H07141153 | 6/1995 |
| JP | H086729 | 1/1996 |
| JP | 2001526550 | 5/1997 |
| JP | H09185504 | 7/1997 |
| JP | H9251494 | 9/1997 |
| JP | 2000293369 | 10/2000 |
| JP | 2001051742 | 2/2001 |
| JP | 2003510684 | 3/2001 |
| JP | 2001101033 | 4/2001 |
| JP | 2003510713 | 4/2001 |
| JP | 2001184472 | 7/2001 |
| JP | 2001312325 | 11/2001 |
| JP | 2001331229 | 11/2001 |
| JP | 2001338233 | 12/2001 |

OTHER PUBLICATIONS

Specification of U.S. Appl. No. 11/006,837, filed Dec. 8, 2004.
Gao, Jerry et al., "Online Advertising—Taxonomy and Engineering Perspectives", http://www.enqr.sjsu.edu/gaojerry/report/OnlineAdvertising%20.pdf, (2002),33 pages.
"International Search Report and Written Opinion", Application No. PCT/US05/40940, 18 pages.
"Decision to Refuse a European Application mailed Feb. 15, 2008", Application No. 05110697.9, 45 pages.
U.S. Appl. No. 11/018,095, Including O/As dated Aug. 19, 2009, Feb. 5, 2009, Oct. 21, 2009, and Mar. 25, 2008.
U.S. Appl. No. 10/968,462, Including O/As dated Mar. 18, 2008, and Notice of Allowance dated Jul. 24, 2008.
U.S. Appl. No. 11/022,493, Including O/A dated Aug. 10, 2011.
U.S. Appl. No. 11/152,214, Including O/A dated Jun. 9, 2011.
JP2007-552142, Including O/A dated Aug. 5, 2011.
JP2007-541363, Including O/A dated Jul. 5, 2011.
JP2007-54361, Including O/As dated Jun. 7, 2011.
MX/a/2007/005657, Including O/As dated Jun. 29, 2009.
EP05820090.8, Including O/As dated Jan. 11, 2008 and Mar. 5, 2008.
CN200550038813.9, Including O/As dated Apr. 11, 2008 and May 22, 2009.
MX/a2007/005656, Including O/As dated Jun. 29, 2009, Feb. 10, 2010 and Oct. 18, 2010.
MX/a/2007/005659, Including O/As dated Nov. 30, 2009 and Jul. 2, 2010.
EP05820177.3, Including Search dated Dec. 6, 2010.
CN200580038812.4, Including O/As dated Dec. 18, 2009, Apr. 1, 2010 and Notice of Allowance dated May. 5, 2011.
MX/a/2007/005660, Including O/As dated Jul. 7, 2009 and Notice of Allowance dated Feb. 18, 2010.
EP05823253.9, Including Search dated Aug. 13, 2010.
CN200580038745.6, Including O/As dated Sep. 27, 2010.
MX/a/2007/005662, Including O/As dated Jul. 8, 2009 and Notice of Allowance dated Feb. 19, 2010.

EP05821183.0, Including O/As Jan. 7, 2011 and Search dated Jul. 23, 2010.
CN200580038773.8, Including Notice of Allowance dated Dec. 25, 2009.
MX/a/2007/005655, Including O/As dated Jun. 26, 2009, Feb. 9, 2010, and Sep. 24, 2010.
EP05819896.1, Including O/As dated Mar. 19, 2010 and Search dated Jan. 21, 2010.
CN200680033207.2, Including O/As dated Jul. 30, 2010.
U.S. Appl. No. 10/966,428, Including O/As dated Aug. 22, 2008,Mar. 10, 2008 and Notice of Allowance dated Nov. 6, 2008.
EP05109616.2, Including Search dated Jan. 2, 2008.
U.S. Appl. No. 10/982,962, Including O/As dated Oct. 7, 2008, May 13, 2008.
"International Search Report and Written Opinion mailed Jan. 16, 2006", Application No. PCT/US2006/034622, 6 pages.
"International Search Report and Written Opinion mailed Nov. 30, 2006", Application No. PCT/US05/40950, 8 pages.
Qiao, Daji et al., "MiSer: An Optimal Low-Energy Transmission Strategy for IEEE 802.11 a/h", *obtained from ACM*, (Sep. 2003),pp. 161-175.
"International Search Report and Written Opinion mailed Apr. 22, 2008", Application No. PCT/US2007/087960, 7 pages.
Eren, H. et al., "Fringe-Effect Capacitive Proximity Sensors for Tamper Proof Enclosures", *Proceedings of 2005 Sensors for Industry Conference*, (Feb. 2005),pp. 22-55.
"International Search Report and Written Opinion mailed Nov. 15, 2004", Application No. PCT/US05/40966, 9 pages.
Schneier, B. "Applied Cryptography, Second Edition: Protocols, Algorithms, and Source Code in C (cloth)", (Jan. 1, 1996),13 pages.
Goering, Richard "Web Venture Offers Metered Access to EDA Packages—Startup Winds Clocks by the Hour Tools (E*CAD Will Launch Web Site That Provides Pay-Per-Use and Pay-Per-Hour Access to Range of Chip Design Software)", *Electronic Engineering Times*, (Nov. 6, 2000),3 pages.
Zemao, Chen et al., "A Malicious Code Immune Model Based on Program Encryption", *IEEE—Wireless Communication, Networking and Mobile Computing*, WICOM '08, 4th International Conference on Oct. 12-14, 2008,5 pages.
Mufti, Dr. Muid et al., "Design and Implementation of a Secure Mobile IP Protocol", *Networking and Communication, INCC 204*, International Conference on Jun. 11-13, 2004,5 pages.
Davida, George I., et al., "UNIX Guardians: Active User Intervention in Data Protection", *Aerospace Computer Security Applications Conference*, Fourth Dec. 12-16, 1988,6 pages.
Morales, Tatiana "Understanding Your Credit Score", http://www.cbsnews.com/stories/2003/04/29/earlyshow/contributors/raymartin/main55152.shtml retrieved from the Intenet on Apr. 23, 2009, (Apr. 30, 2003),3 pages.
"Achieving Peak Performance: Insights from a Global Survey on Credit Risk and Collections Practices", *GCI Group Pamphlet*, (2002, 2004),12 pages.
"Equifax Business Solutions—Manage Your Customers", Retrieved from the Internet from http://www.equifax.com/sitePages/biz/smallBiz/?sitePage=manage Customers on Oct. 14, 2005, 3 pages.
"Prequalification Using Credit Reports", Retrieved from the Internet at http://www.credco.com/creditreports/prequalification.htm on Oct. 14, 2005, 2 pages.
Gao, Jerry et al., "Online Advertising—Taxonomy and Engineering Perspectives", http://www.engr.sjsu.edu/gaojerry/report/OnlineAdvertising%20.pdf, (2002),33 pages.
Oshiba, Takashi et al., "Personalized Advertisement-Duration Control for Streaming Delivery", *ACM Multimedia*, (2002),8 pages.
Yue, Wei T., et al., "The Reward Based Online Shopping Community", *Routledge*, vol. 10, No. 4, (Oct. 1, 2000),2 pages.
"International Search Report and Written Opinion mailed Nov. 8, 2007", Application No. PCT/US05/40967, 5 pages.
"International Search Report and Written Opinion". Application No. PCT/US05/40940, 18 pages, (Jun. 18, 2008).
"International Search Report and Written Opinion mailed Apr. 25, 2007", Application No. PCT/US05/040965, 5 pages.
"International Search Report and Written Opinion mailed Sep. 25, 2006", Application No. PCT/US05/40949, 7 pages.

"EP Office Action Mailed Nov. 17, 2006", Application No. 05110697.9, 6 pages.
"EP Office Action mailed Apr. 5, 2007", Application No. 05110697.9, 5 pages.
"EP Summons to Attend Oral Proceedings mailed Sep. 27, 2007", Application No. 05110697.9, 7 pages.
"Decision to Refuse a European Application mailed Feb. 15, 2008", Application No. 051106997.9, 45 pages.
"International Search Report and Written Opinion mailed Sep. 8, 2006", Application No. PCT/US05/040942, 20 pages.
"European Search Report mailed Dec. 6, 2010", Application No. EP/05820177, 8 pages.
U.S Appl. No. 11/018,095, Including O/As dated Mar. 15, 2010; Jul. 8, 2010; Dec. 27, 2010; Jun. 9, 2011; and Sep. 27, 2011.
"Notice of Rejection mailed Sep. 9, 2011", JP Application No. 2007-548385, 9 pages.
U.S. Appl. No. 11/021,021, Including O/As dated Mar. 16, 2007 and Sep. 6, 2007 and Notice of Allowance dated Nov. 21, 2007.
U.S. Appl. No. 11/210,611, Including O/A dated Jun. 25, 2009 and Notice of Allowance dated Dec. 28, 2009.
U.S. Appl. No. 11/007,089, Including O/As dated Mar. 6, 2007, Jun. 4, 2007, Aug. 17, 2007, Nov. 1, 2007, Jun. 30, 2007 and Sep. 23, 2008.
U.S. Appl. No. 11/020,329, Including O/A dated Aug. 22, 2007 and Notice of Allowance dated Feb. 8, 2008.
U.S. Appl. No. 11/034,377, Including O/As dated Feb. 2, 2007, Jul. 24, 2007, Mar. 28, 2008, Oct. 5, 2009.
U.S. Appl. No. 11/039,165 Including O/As dated Apr. 23, 2008 and Nov. 19, 2008 and Notice of Allowance dated Apr. 30, 2010.
U.S. Appl. No. 11/057,266, Including O/A dated Aug. 23, 2007 and Notice of Allowance dated Nov. 26, 2007.
U.S. Appl. No. 11/087,263, Including O/As dated Jun. 26, 2007, Nov. 14, 2007, Feb. 14, 2008, Oct. 29, 2008 and Mar. 23, 2005.
U.S. Appl. No. 11/074,500, Including O/A dated Sep. 7, 2007 and Notice of Allowance dated Mar. 20, 2008.
U.S. Appl. No. 11/224,635, Including O/A dated May 5, 2009, Jan. 12, 2010, Mar. 23, 2010 and Jul. 30, 2010.
"Extended European Search Report mailed Dec. 6, 2010", EP Application No. 05820177.3, 8 pages.
"Office Action mailed May 26, 2008", EP Application No. 05109616.2, 5 pages.
"Notice on Division of Application mailed Aug. 8, 2008", CN Application No. 200510113398.0,2 pages.
"Notice on First Office Action mailed Dec. 12, 2008", CN Application No. 200510113398.0.
"The Second Office Action mailed Jun. 3, 2009", CN Application No. 200510113398.0, 7 pages.
"Notice on Proceeding with the Registration Formalities mailed Oct. 23, 2009", CN Application No. 200510113398.0, 4 pages.
"Examiner's First Report on Application mailed Jun. 4, 2010", AU Application No. 2005222507, 2 pages.
"Notice of Acceptance mailed Oct. 14, 2010", AU Application No. 2005222507, 3 pages.
"Decision on Grant of a Patent for Invention mailed Apr. 29, 2010", Russian Application No. 2005131911, 31 pages.
"Office Action mailed Dec. 3, 2009", Russian Application No. 2005131911.
"Notice of Allowance mailed Nov. 13, 2009", MX Application No. PA/a/2005/011088, 2 pages.
"TCG Specification Architecture Overview", Revision 1.2, (Apr. 28, 2004),55 pages.
"International Search Report and Written Opinion mailed Jun. 19, 2007", PCT Application No. PCT/US05/46091, 11 pages.
"Notice on Grant of Patent Right for Invention mailed Jan. 29, 2010", CN Application No. 200580040764.2, 4 pages.
"International Search Report mailed Jan. 5, 2007", Application No. PCT/US2006/032708, 3 pages.
"Cyotec—CyoLicence", printed from www.cyotec.com/products/cyoicence on Sep. 7, 2005, (Copyright 2003-2005).
"Magic Desktop Automation Suite for the Small and Mid-Sized Buisness", printed from www.remedy.com/soultions/magic_it_suite.htm on Sep. 7, 2005, (Copyright 2005), 4 pages.
"PACE Anti-Piracy Introduction", printed from www.paceap.com/psintro.html on Sep. 7, 2005, (Copyright 2002),4 pages.

"Office Action mailed Jul. 6, 2009", MX Application No. MX/a/2007/005661, 6 pages.
"Office Action mailed Oct. 1, 2010", MX Application No. MX/a/2007/005661, 3 pages.
"Office Action mailed Mar. 8, 2011", MX Application No. MX/a/2007/005661, 8 pages.
"Notice on Second Office Action mailed Jun. 7, 2010", CN Application No. 200680030846.3, 6 pages.
"Decision on Rejection mailed Sep. 13, 2010", CN Application No. 200680030846.3, 5 pages.
Kwok, Sai H., "Digital Rights Management for the Online Music Business", *ACM SIGecom Exhchanges*, vol. 3, No. 3, (Aug. 2002),pp. 17-24.
"International Search Report and Written Opinion mailed Mar. 21, 2007", Application No. PCT/US05/46223, 10 pages.
"The First Office Action mailed Oct. 9, 2009", CN Application No. 200580043102.0, 20 pages.
"Notice of Rejection mailed Jun. 13, 2011", JP Application No. 2007-551270, 4 pages.
"International Search Report and Written Opinion mailed Jul. 9, 2008", Application No. PCT/US05/46539, 11 pages.
"Notice of the First Office Action mailed Dec. 29, 2010", CN Application No. 200580044294.7, 9 pages.
"Office Action mailed Jul. 1, 2009", MX Application No. 2007/a/2007/007441.
"European Search Report mailed Aug. 31, 2011", EP Application No. 05855148.2, 6 pages.
"International Search Report and Written Opinion mailed Sep. 25, 2007", Application No. PCT/US06/12811, 10 pages.
"Examiner's First Report mailed Sep. 15, 2009", AU Application No. 2006220489, 2 pages.
"Notice of Acceptance mailed Jan. 25, 2010", AU Application No. 2006220489, 2 pages.
"The First Office Action mailed Aug. 22, 2008", CN Application No. 200680006199.2, 23 pages.
"The Second Office Action mailed Feb. 20, 2009", CN Application No. 200680006199.2, 9 pages.
"The Fourth Office Action mailed Jan. 8, 2010", CN Application No. 200680006199.2, 10 pages.
"The Fifth Office Action mailed Jul. 14, 2010", CN Application No. 200680006199.2, 6 pages.
"Notice on Grant of Patent mailed Oct. 20, 2010", CN Application No. 10/20/10, 4 pages.
"First Office Action mailed Aug. 21, 2009", CN Application No. 200680030846.3, 8 pages.
"Notice of Rejection mailed Jul. 12, 2011", JP Application No. 2007-541351, 4 pages.
"Notice of Rejection mailed Jul. 22, 2011", JP Application No. 2007-541362.
"Notice of Rejection mailed Jul. 15, 2011", JP Application No. 2007-541356, 4 pages.
"Notice of Rejection mailed Jul. 26, 2011", JP Application No. 2007-541352, 5 pages.
"Notice of Rejection mailed Jul. 22, 2011", JP Application No. 2007-541355 4 pages.
"Notice of Allowance mailed Sep. 12, 2011", U.S. Appl. No. 11/224,635.
"Notice on the First Office Action mailed Dec. 11, 2009", CN Application No. 200510127170.7, 16 pages.
"Notice of Rejection mailed Jun. 21, 2011", JP Application No. 2005-330496, 6 pages.
Lampson, Butler et al., "Authentication in Distributed Systems: Theory and Practice", *ACM Transactions on Computer Systems*, v10, 265,(1992),18 pages.
"DMOD WorkSpace OEM Unique Features", www.dmod.com/oem_features, Retrieved from the Internet on Jan. 12, 2005,3 pages.
"Notice of Rejection mailed Jun. 7, 2011", Japanese Application No. 2007-541361, 3 pages.
"Office Action mailed Jun. 29, 2009", Mexican Application No. MX/a/2007/005657, 2 pages.
"Search Report Dated Jan. 11, 2008", EP Application No. 05820090.8, 7 pages.

"Examination Report mailed Mar. 5, 2008", EP Application No. 05820090.8, 1 page.
"First Office Action mailed Apr. 11, 2008", Chinese Application No. 200580038813.9, 11 pages.
"Office Action mailed Jun. 29, 2009", Mexican Application No. MX/a/2007/005656, 6 pages.
"Office Action mailed Nov. 30, 2009", Mexican Application No. MX/a/2007/005659, 6 pages.
"Notice of Allowance mailed Jul. 2, 2010", Mexican Application No. MX/a/2007/005659, 2 pages.
"Second Office Action mailed Dec. 18, 2009", Chinese Application No. 200580038812.4, 24 pages.
"Third Office Action mailed Apr. 1, 2010", Chinese Application No. 200580038812.4, 9 pages.
"Notice on Grant of Patent Right for Invention mailed May 5, 2011", Chinese Application No. 200580038812.4, 4 pages.
"Office Action mailed Jul. 7, 2009", Mexican Application No. MX/a/2007/005660, 8 pages.
"Notice of Allowance mailed Feb. 18, 2010", Mexican Application No. MX/a/2007/005660, 2 pages.
"Extended European Search Report mailed Aug. 13, 2010", EP Application No. 05823253.9, 7 pages.
"Notice on the First Office Action mailed Sep. 27, 2010", Chinese Application No. 200580038745.6, 6 pages.
"Office Action mailed Jul. 8, 2009", Mexican Application No. MX/a/2007/005662, 7 pages.
"Notice of Allowance mailed Feb. 19, 2010", Mexican Application No. MX/a/2007/005662, 2 pages.
"Partial Search Report mailed Jul. 23, 2010", EP Application No. 05821183.0.
"Extended European Search Report mailed Jan. 7, 2011", EP Application No. 05821183.0, 9 pages.
"Notice of Allowance mailed Dec. 25, 2009", Chinese Application No. 200580038773.8, 4 pages.
"Office Action mailed Jun. 26, 2009", Mexican Application No. MX/a/2007/005655, 5 pages.
"Office Action mailed Feb. 9, 2010", Mexican Application No. MX/a/2007/005855, 6 pages.
"Office Action mailed Sep. 24, 2010", Mexican Application No. MX/a/2007/005655, 3 pages.
"Extended European Search Report mailed Jan. 21, 2010", EP Application No. 05819896.1, 8 pages.
"Office Action mailed Mar. 19, 2010", EP Application No. 05819896.1, 1 page.
"Office Action mailed Feb. 10, 2010", Mexican Applicaiton No. MX/a/2007/005656, 5 pages.
"Office Action mailed Oct. 18, 2010", Mexican Application No. MX/a/2007/005656, 3 pages.
"Office Action mailed May 22, 2009", Chinese Application No. 200580038771.9, 5 pages.
"Notice on the First Office Action mailed Jul. 30, 2010", Chinese Application No. 200680033207.2, 7 pages.
"EP Search Report mailed Jan. 2, 2008", EP Application No. 05109616.2, 7 pages.
"Flonix: USB Desktop OS Solutions Provider, http://www.flonix.com", *Retrieved from the Internet* Jun. 1, 2005, (Copyright 2004),2 pages.
"Migo by PowerHouse Technologies Group, http://www.4migo.com", *Retrieved from the Internet* Jun. 1, 2005, (Copyright 2003),3 pages.
"WebServUSB, http://www.webservusb.com", *Retrieved from the Internet* Jun. 1, 2005, (Copyright 2004),16 pages.
"Notice of Rejection mailed Jul. 5, 2011", Japanese Application No. 2007-541363, 10 pages.
"Notice of Rejection mailed Aug. 5, 2011", Japanese Patent Application No. 2007-552142, 8 pages.
"Notice of Rejection mailed Nov. 11, 2011", Japanese Application No. 2005-301957, 21 pages. (MS#310416.06).
Utagawa, Mari et al., "Creation of Card Application by IC Card OS 'Multos' Which Can Rewrite Application", Interface, vol. 29, No. 3, ISSN: 0387-9569, CQ Publishing Co. Ltd., (Mar. 1, 2003),pp. 46-55.
"Extended European Search Report mailed Dec. 21, 2011", EP Application No. 05854752.2, 7 pages. (MS#310476.10).

"Office Action mailed Dec. 7, 2011", JP Application No. 2008-528054, 7 pages. (MS#310477.31).

"Final Rejection mailed Jan. 17, 2012", Japan Application No. 2007-552142, 8 pages. (MS#310522.06).

"EP Office Action mailed Mar. 8, 2012", EP Application No. 05109616.2, 6 pages. (MS#310416.05).

"Office Action mailed Dec. 7, 2011", JP Application No. 2008-528054, 7 pages.

"Notice of Preliminary Rejection mailed May 30, 2012", Korean Patent Application No. 10-2007-7011069, 1 page.

Mois, Dan et al., "Reconfiguration Security for Hardware Agents in Testing", Automation Quality and Testing Robotics (AQTR), 2010 IEEE International Conference on vol. 2, (2010), pp. 1-5.

Zhang, Kai et al., "Reconfigurable Security Protection System Based on Net FPGA and Embedded Soft-Core Technology", Computer Design and Applications (ICCDA), 2010 International Conference on Volume, (2010),pp. V5-540-V5-544.

Ooi, Joo G., et al., "A Proof of Concept on Defending Cold Boot Attack", Quality Electronic Design, ASQED 2009, 1st Asia Symposium, (2009),pp. 330-335.

"Extended European Search Report mailed Jul. 5, 2012", EP Application No. 05851550.3 (MS#310477.26), 6 pages.

"Preliminary Rejection mailed Jul. 4, 2012", Korean Application No. 10-2007- 7012294, 2 pages.

"Office Action mailed Jun. 8, 2012", JP Application No. 2005-301957, 8 pages.

Nakajima, S. "Do You Really Know It? Basics of Windows2000/XP Network, 4th Installment, What is Logon Like?", Nikkei Business Publications, Inc., (Jan. 2004),pp. 116-121.

"First Special Feature, Security Oriented Web Application Development, Part 3, Method for Realizing Secure Session Management", N'Network Guide (vol. 4,.U.S. Appl. No. 32) Softbank Publishing Inc., (Jan. 2004),pp. 47-59.

* cited by examiner

SYSTEM AND METHOD FOR DELIVERY OF A MODULAR OPERATING SYSTEM

TECHNICAL FIELD

This disclosure relates to operating systems and particularly relates to a system and method for delivery of a modular operating system.

BACKGROUND

Operating systems typically include functions such as hardware management memory management, disk file systems, a basic graphics engine, and application runtime support. Operating systems are available as monolithic blocks that incorporate all the above functions and often more. Purchasing these large operating systems can represent a significant portion of the cost of an overall computer system. After purchase, the user may find significant functionality available that is not required, or some functions that would be desirable that are not available.

SUMMARY

According to one aspect of the disclosure an operating system is composed of a small basic kernel, often given away for free. The small basic kernel, may be used for simple operations and for basic application support. A user of the computer system may then have the opportunity to add specific modules supporting the functionality required for his or her particular interests. While some add-on modules may be free, others may be available for a fee or as part of a subscription.

According to another aspect of the disclosure, multiple users may each build from the small basic kernel to personalize and customize the operating system for their individual needs on the same computer. For example, one user may purchase and install a suite support pack to improve the performance of utilities such as word processors. Another user may choose a game support pack that may include 3-D graphics acceleration, more memory, a game controller driver, and advanced sound support.

According to another aspect of the disclosure, digital rights management may be used to manage add-on modules. As opposed to the prior art, where the operating system is available in perpetuity, add-on modules may be available for limited periods of time, based on the license terms. It may also be possible to allow only certified or authorized add-on modules to be installed, enabling digital rights management to allow selective purchase by users, fraud control for providers and also to restrict unauthorized operating system extensions from being installed that may support unauthorized hardware and/or software.

According to yet another aspect of the disclosure, add-on modules may allow extensions to initial basic functions, such as, the number of windows allowed, the number of processors in use, the amount of memory available, and the number of concurrent applications running.

DETAILED DESCRIPTION OF VARIOUS EMBODIMENTS

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Much of the inventive functionality and many of the inventive principles are best implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts in accordance to the present invention, further discussion of such software and ICs, if any, will be limited to the essentials with respect to the principles and concepts of the preferred embodiments.

Figure 1:
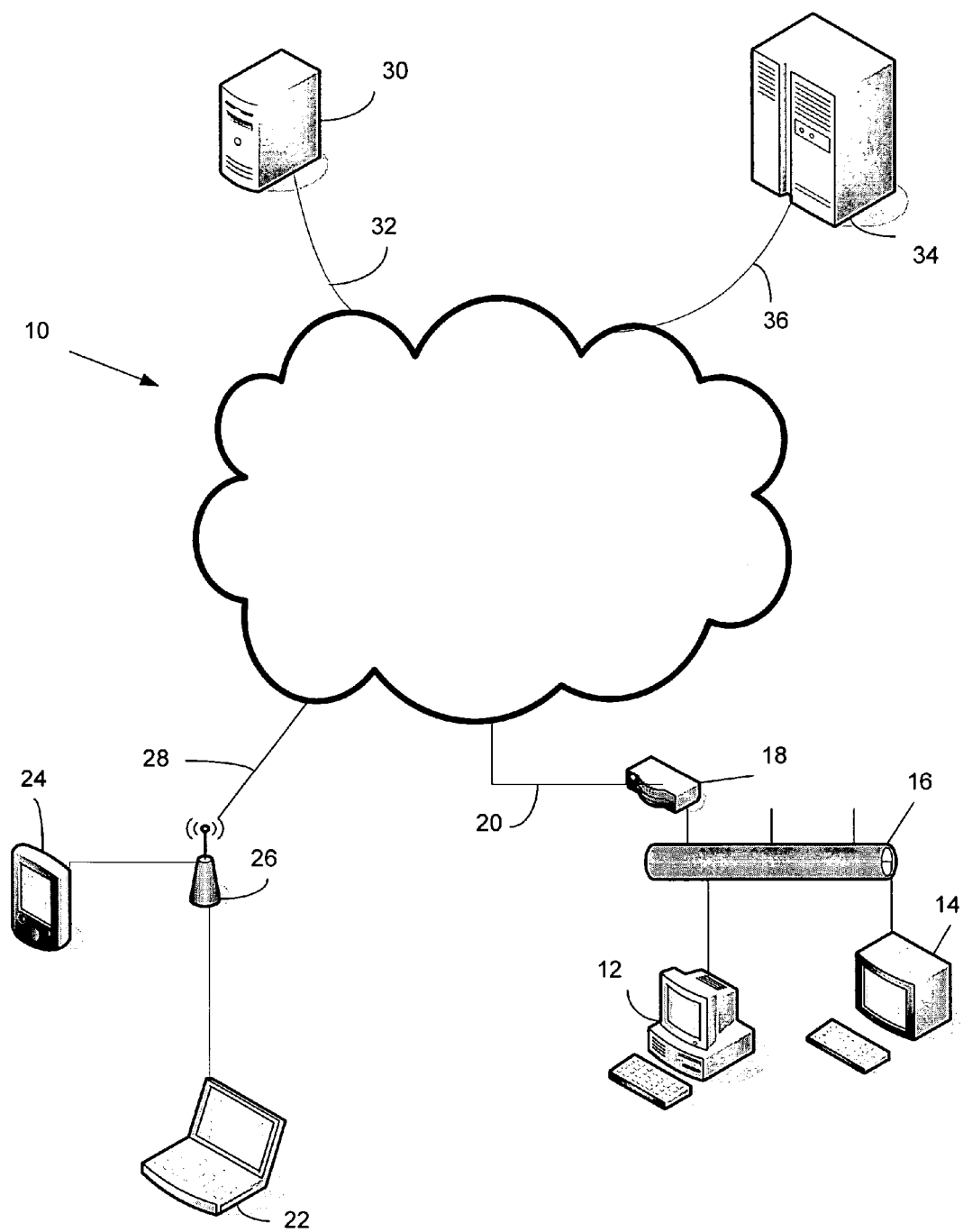
FIG. 1 is a simplified and representative block diagram of a computer network.

FIG. 1 illustrates a network 10 that may be used to implement a dynamic software provisioning system. The network 10 may be the Internet, a virtual private network (VPN), or any other network that allows one or more computers, communication devices, databases, etc., to be communicatively connected to each other. The network 10 may be connected to a computer 12, such as a personal computer and a computer terminal 14 via an Ethernet 16 and a router 18, and a landline 20. On the other hand, the network 10 may be wirelessly connected to a laptop computer 22 and a personal data assistant 24 via a wireless communication station 26 and a wireless link 28. Similarly, a server 30, such as a proxy server or edge server may be connected to the network 10 using a communication link 32 and a web server 34 may be connected to the network 10 using another communication link 36.

Figure 2:
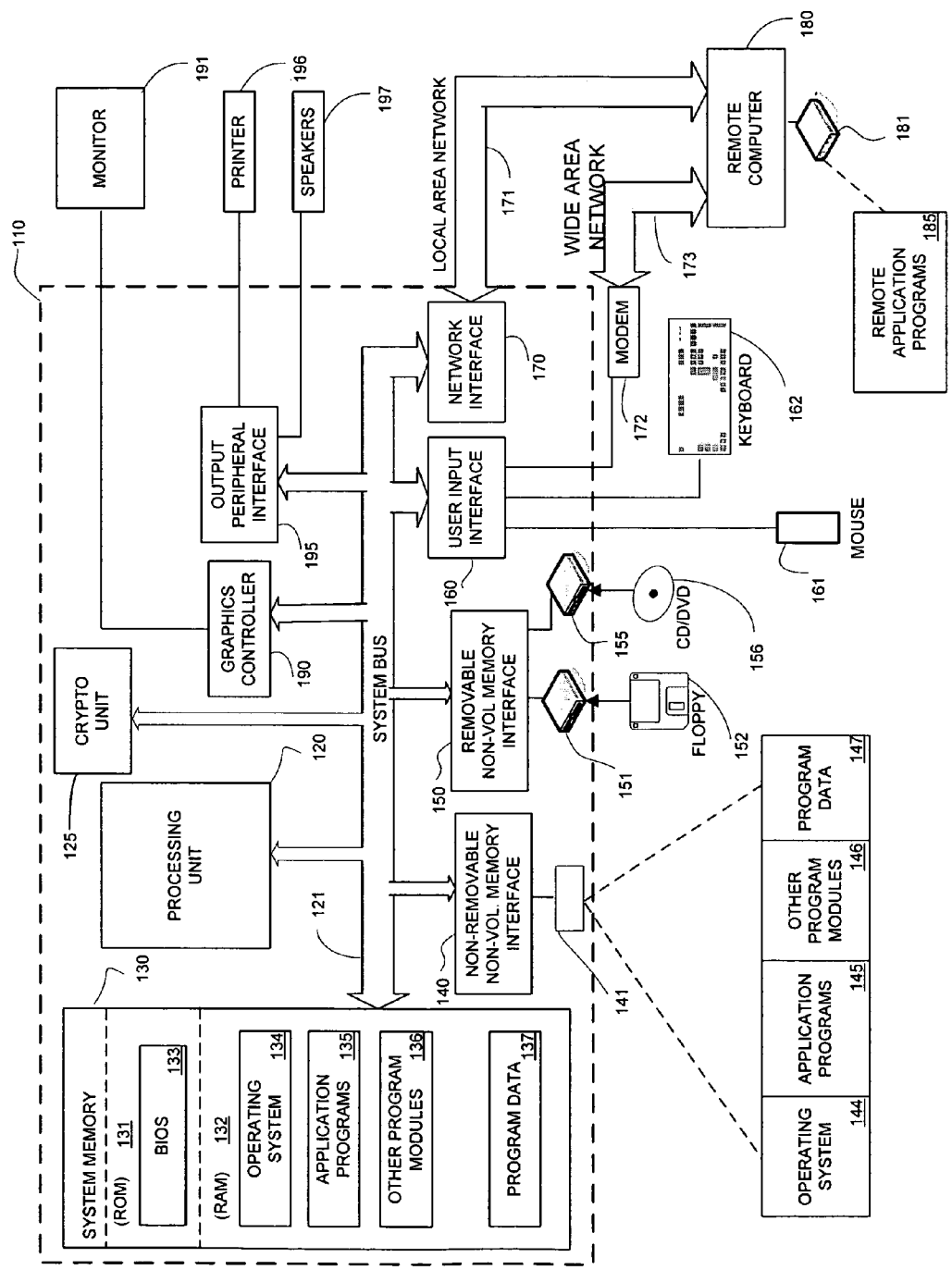
FIG. 2 is a simplified and representative block diagram of a computer.

FIG. 2 illustrates a computing device in the form of a computer 110. Components of the computer 110 may include, but are not limited to a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 may also include a cryptographic unit 125. Briefly, the cryptographic unit 125 has a calculation function that may be used to verify digital signatures, calculate hashes, digitally sign hash values, and encrypt or decrypt data. The cryptographic unit 125 may also have a protected memory for storing keys and other secret data. Another function supported by the cryptographic unit 125 may be digital rights management, that in its simplest form is a variation of encryption. The cryptographic unit may also include a timer or clock (not depicted) to support expiration dates and some usage limits. In other embodiments, the functions of the cryptographic unit may be instantiated in software and run via the operating system.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, FLASH memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during startup, is typically stored in ROM 131. RAM 132 typically contains data and/or program modules that are immediately accessible to and/or presently being operated on by processing unit 120. By way of example, and not limitation, FIG. 2 illustrates operating system 134, application programs 135, other program modules 136, and program data 137.

The computer 110 may also include other removable/non-removable, volatile/nonvolatile computer storage media. By way of example only, FIG. 2 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2, provide storage of computer readable instructions, data structures, program modules and other data for the computer 110. In FIG. 2, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and cursor control device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a graphics controller 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 2. The logical connections depicted in FIG. 2 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 2 illustrates remote application programs 185 as residing on memory device 181.

The communications connections 170 172 allow the device to communicate with other devices. The communications connections 170 172 are an example of communication media. The communication media typically embodies computer readable instructions, data structures, program modules or other data in a modulated data signal such as a carrier wave or other transport mechanism and includes any information delivery media. A "modulated data signal" may be a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Computer readable media may include both storage media and communication media.

Figure 3:
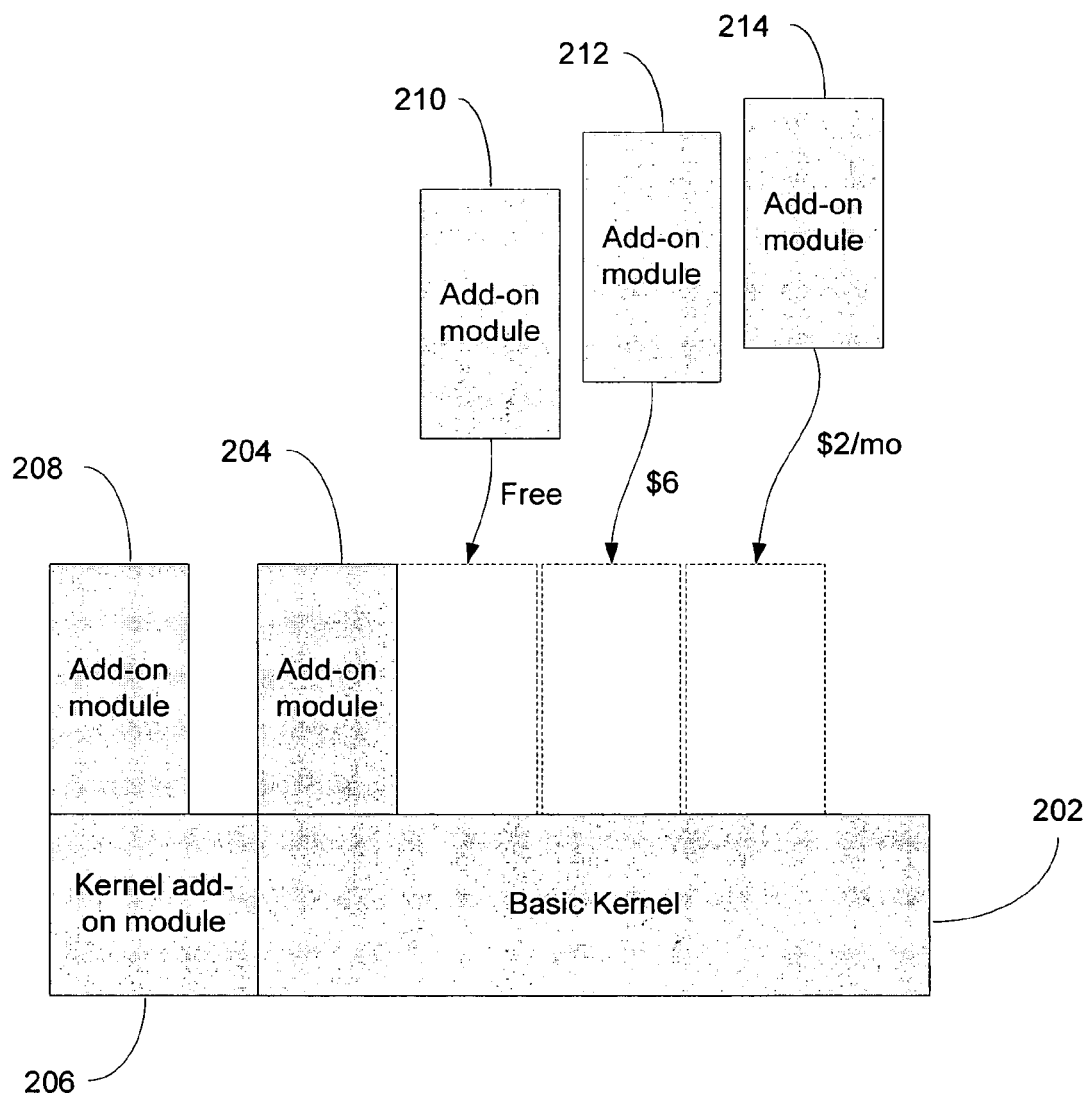
FIG. 3 is a simplified and representative block diagram illustrating the functional relationship between operating system elements.

FIG. 3 shows a simplified block diagram of the relationship between the basic kernel and add-on modules. The basic kernel 202 may supply functions such as basic memory management, system input/output, boot processes, file system support, and fundamental display capabilities. Add-on modules provide a mechanism to extend or increase the capabilities of the basic kernel 202. As depicted in FIG. 3, add-on module 204 has been included into the basic kernel 202 system. A basic kernel add-on module 206 may provide support for additional memory or multiple processors, for example. Add-on module 208 may extend the functionality of kernel add-on module 206. Add-on module 208 may similarly extend the basic kernel function, such as adding support for higher-speed operation of a multiple processor environment. Additional add-on modules 210 212 214 are depicted as not yet being installed. For the sake of illustration, it is shown that add-on module 210 is available for free, add-on module 212 has a one-time charge of $6, and add-on module 214 has an ongoing charge of $2 per month.

By way of illustration, and not limitation, some of the functions associated with add-on modules are discussed in several broad categories: hardware, peripherals, communication and applications/bundles.

The hardware category may include power management, removable memory support, metered disk drives, multiple processor support, increased screen resolution, increased screen color depth, 3D acceleration, and patches/bug fixes/service packs. Power management offers the user options for setting power consumption, particularly in a laptop, but also for desktop environments. Removable memory support may include capabilities for rotating media such as CD and DVD, as well as solid-state memory such as USB memory peripherals. A metered disk drive (not depicted) may provide a user with a base function for small capacity disk storage at a given speed. Advanced support for disk access may include high speed/high capacity drives as well as network drives. In a base configuration supported by the basic kernel 202, the number of processors may be limited to one, or to a fixed performance level. An add-on module for processor support may allow variable performance levels up to the maximum capability of the processor or may include activation of additional processors both locally and on a network. The basic kernel 202 of the operating system may support limited screen resolutions and color depth, while an add-on module may expand those capabilities. 3-D acceleration is of interest to some users is discussed further below. In the area of operating system maintenance, service packs, bug fixes, and patches have been included in the original purchase price of an operating system for prior art systems. The use of an add-on module for support of bug fixes, service packs, and patches allows users to selectively pay for only the support that is of interest to them.

The peripheral category may include installed printers, COM ports, USB ports, telephone service, and the number of peripherals allowed. A computer 110 functioning with the basic kernel operating system 202 may have limited peripheral support. Add-on modules may allow users to select the types, speed, and number of peripherals allowed and supported.

The communication category may include network interfaces, such as dial up, TCP, and peer-to-peer networks, etc. A computer 110 supported by the basic kernel 202 may not include any network support for use in basic applications. For example, in areas where communication infrastructure is nonexistent or limited, a user may not wish to invest in high speed communication capability. Add-on modules for communication may be used to support low-speed access such as dial up, higher-speed access, for example, DSL speeds up 500 kilobits per second, or speeds up to the maximum supported by the available hardware. Communication may also be limited by type, such as support for Internet browsing separate from peer-to-peer networking.

While most of the capabilities discussed in the following are also shown above, application specific packages or bundled add-on modules may be used to provide easy support for users having a specific interest. For example, a power user may want specific window and background themes with associated styles, a significant number of concurrent windows, and an unlimited number of concurrent applications, up to the capacity of the hardware. A game support pack including advanced sound support, game controller support, and increased video memory may be of interest to those users primarily interested in interactive games. Users of business support applications may benefit from a support pack including high speed disk access, network drive support, and network printing, for example.

While not exhaustive, the above illustrate the nature and range of capabilities that may be supported by add-on modules and a basic kernel operating system.

Figure 4:
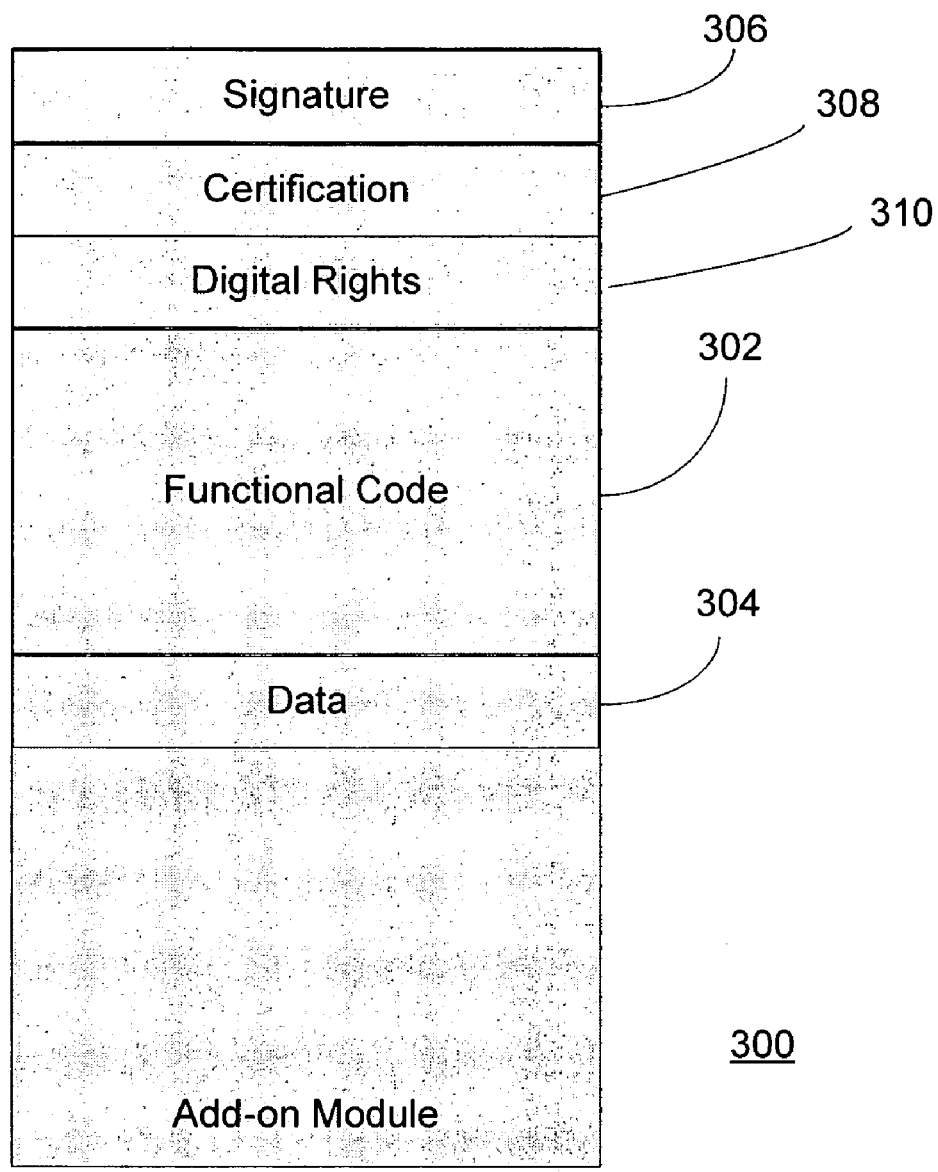
FIG. 4 is a simplified and representative block diagram of an exemplary add-on module.

FIG. 4 illustrates a representative add-on module, such as the add-on modules discussed with respect to FIG. 3. The add-on module 300 may include functional code 302 and support data 304. The functional code 302 may include software, algorithms, and utilities for supporting the specific function provided by the add-on module 300. Data 304 may include both static and dynamic data, such as icons, environment data, settings, or user data. The add-on module 300 may further include a digital signature 306. Digital signatures, such as digital signature 306 are well known in the industry but, in brief, may be used to verify the integrity of the add-on module 300 as received, as well as to confirm the identity of the source of the add-on module 300. Digital signatures may be verified using the cryptographic unit 125 shown in FIG. 2.

A certification 308 may be used in addition to digital signature 306. While the digital signature 306 may be used to verify, for example, authorship of the add-on module functional code 302, the certification 308 may be used to verify authorization to install the add-on module 300 granted by a service provider or other interested party. For example, a service provider may, for business or support reasons, wish to restrict the use of certain add-on modules even though they are compatible with the basic kernel 202.

Digital rights indicia 310 may be used to impose limits on usage of the add-on module 300. The digital rights indicia 310 may cover usage until an expiration date, a number of uses over a time period, a cumulative number of uses, or a via metadata processed, as some examples.

Figure 5:
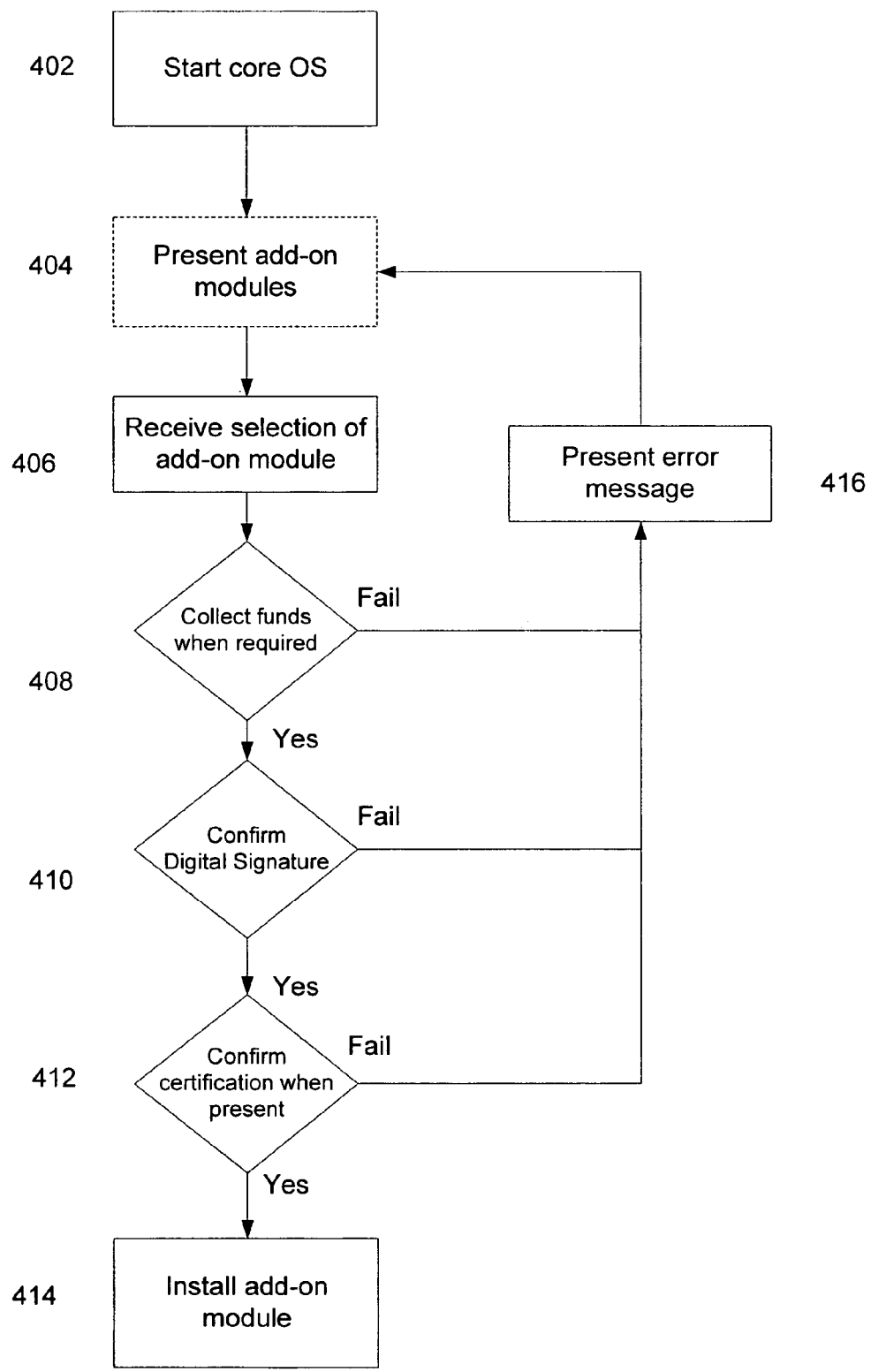
FIG. 5 is a flow chart depicting a method for extending a basic operating system using add-on modules.

FIG. 5 may illustrate a method of identifying and installing add-on modules. A computer, such as computer 110, may start 402 basic kernel 202 of a core operating system when booted. A user may be presented at block 404 with a selection of add-on modules, such as add-on module 300, for example, showing capability and cost, if any. The basic kernel 202 of the core operating system may then receive 406 a selection of add-on modules. The selection made at block 406 may include an explicit or implicit funding authorization. When funding is required, funds may be collected at block 408. Funding may be accomplished by any of the known mechanisms, such as payment from a pre-paid account or by an on-line funds transfer. Once the funding operation completes successfully, the yes branch from block 408 may be followed.

The selected add-on module 300 may be present, or may need to be downloaded (not depicted). A digital signature 306 may be confirmed at block 410 to ensure the add-on module 300 is intact and untampered as well as to verify the identity of the signer. When the digital signature is confirmed, execution may follow the yes branch from block 410 where a certification 308, if present, is confirmed at block 412. As discussed above, the certification 308 may be present in addition to a digital signature and may relate more to authorization for loading as opposed to checking integrity and source verification which may depend more on the digital signature. When the certification is confirmed at block 412, the yes branch may be followed to block 414 where the add-on module 300 may be installed and normal operation using the newly installed add-on module may proceed. Additional add-on modules may be installed using a similar method until all desired add-on modules are operational.

Should the funding process at block 408 fail, or the confirmation of the digital signature and certification at blocks 410 and 412 respectively, fail, execution may continue at block 416 where the user may be presented with an error message and choices for continuing. One choice may be to return to block 414 for reselection of an add-on module. Processing after presentation 416 of the error message may also continue by resuming operation (not depicted) using only the basic kernel 202 core operating system and any previously installed add-on modules.

Figure 6:
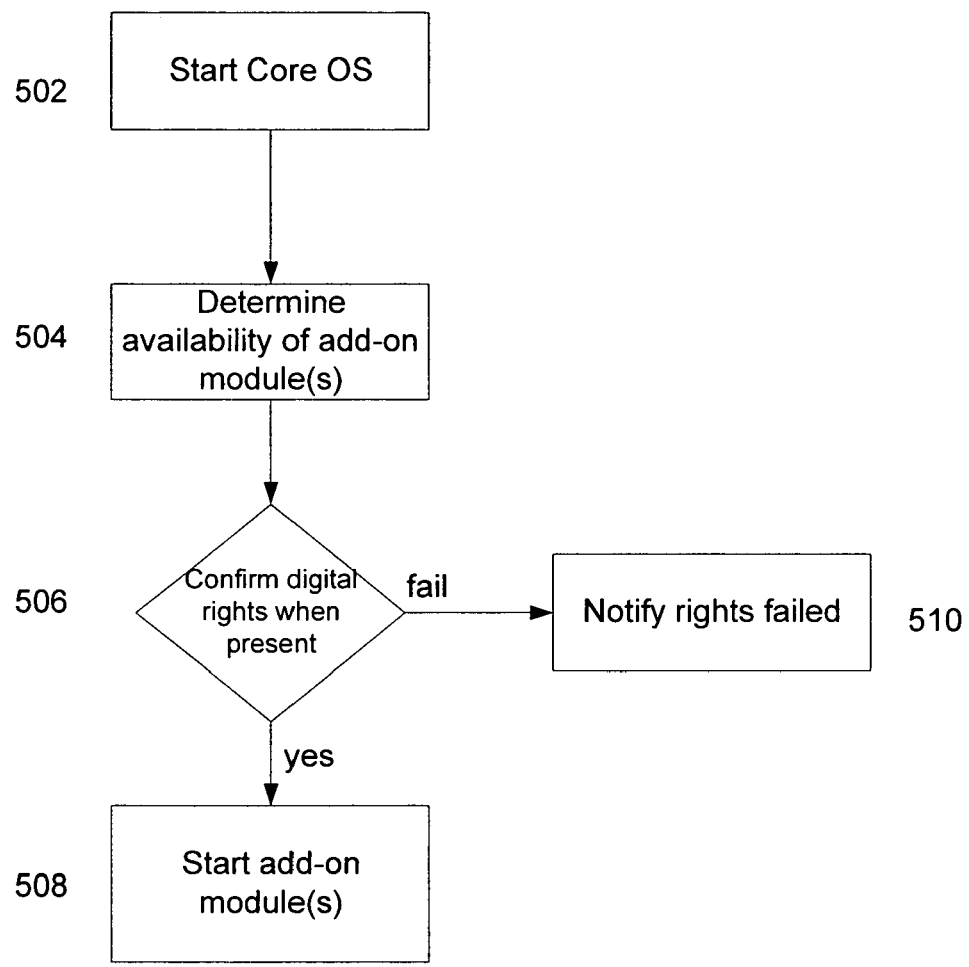
FIG. 6 is a flow chart depicting a method booting a computer using add-on modules.

FIG. 6 depicts a method of booting a computer 110 where one or more add-on modules, such as add-on module 300, are already present and when no additional selections are made. The basic kernel 202, or core operating system, may be started 502. Part of the boot process or initial operation of computer 110 may determine 504 whether add-on modules are installed or available to the basic kernel 202. The add-on module 300 may be examined for digital rights indicia at block 506. When digital rights indicia are present and the criteria required are satisfied, the yes branch from block 506 may be followed and the add-on module started at block 508. Similarly, if no digital rights indicia are present, the add-on module may be started at block 508. Should the digital rights criteria fail at block 506, for example, if an expiration date has passed, the fail branch from block 506 may be followed to block 510 where a notification may be presented to the user indicating the add-on module was not started. The notification at block 510 may further include an opportunity to correct the failure, for example, by purchasing an additional usage allocation.

By following a process such as that described above, users benefit from the flexibility to add only those capabilities to an operating system which are of value, and, in some cases, for a period of time as needed. Operating system vendors may also benefit by reduced piracy of full capacity operating systems in favor of widely available core operating systems that are easily upgradable in affordable increments. Lastly, service providers or system operators who may be providing computers on a pay-as-you-go or pay-per-use basis may be able to limit installation of potentially harmful applications or hardware peripherals by restricting the installation of required operating system add-on modules.

Although the forgoing text sets forth a detailed description of numerous different embodiments of the invention, it should be understood that the scope of the invention is defined by the words of the claims set forth at the end of this patent. The detailed description is to be construed as exemplary only and does not describe every possibly embodiment of the invention because describing every possible embodiment would be impractical, if not impossible. Numerous alternative embodiments could be implemented, using either current technology or technology developed after the filing date of this patent, which would still fall within the scope of the claims defining the invention.

Thus, many modifications and variations may be made in the techniques and structures described and illustrated herein without departing from the spirit and scope of the present invention. Accordingly, it should be understood that the methods and apparatus described herein are illustrative only and are not limiting upon the scope of the invention.

I claim:

1. A method of delivering operating system functionality to a computer, the method comprising:
   implementing a core operating system function on the computer, the core operating system function comprising memory management for the computer;
   determining that a first add-on module for providing additional hardware functionality to the core operating system function is available, the first add-on module providing at least removable memory support for the computer;
   determining whether digital rights criteria associated with the first add-on module are satisfied, the digital rights criteria corresponding to at least one of a number of uses of the first add-on module, an expiration date of the first add-on module, or a cumulative number of uses of the first add-on module, are satisfied; and
   providing the computer with the removable memory support by executing the first add-on module on the computer, responsive to determining that the digital rights criteria have been satisfied.

2. The method of claim 1, further comprising:
   presenting a plurality of add-on modules;
   receiving a selection of the first add-on module from the plurality of add-on modules;
   confirming a digital signature corresponding to the first add-on module; and
   installing the first add-on module on the computer.

3. The method of claim 2, further comprising:
   confirming a certification authorizing installation of the first add-on module.

4. The method according to claim 1, the removable memory support including capabilities for rotating media comprising CD media and DVD media.

5. The method according to claim 1, the removable memory support including capabilities for solid-state memory comprising USB memory peripherals.

6. The method according to claim 1, the first add-on module being selected from a plurality of add-on modules, the plurality of add-on modules providing capability for:
   adding support for power management to the computer;
   adding support for metered disk drives to the computer;
   adding support for multiple processors to the computer;
   adding support for multiple cores within a single processor to the computer;
   adding support for increased screen resolution to the computer;
   adding support for increased screen color depth to the computer; and
   adding support for patches, bug fixes, and service packs to the computer.

7. The method according to claim 6, the support for power management offering user options for setting power consumption by the computer.

8. The method according to claim 6, the support for the metered disk drives comprising advanced support for disk access including high speed drives, high capacity drives, and network drives.

9. The method according to claim 6, wherein the core operating system function supports only one processor and the support for multiple processors includes activation of additional processors.

10. The method according to claim 1, further comprising:
    executing a second add-on module on the computer, the second add-on module allowing variable performance levels for a processor of the computer up to a maximum capability of the processor.

11. The method according to claim 1, wherein the computer comprises a processor, the method further comprising:
    executing a second add-on module on the computer, the second add-on module activating additional processors including an additional processor on the computer and an additional processor on a network.

12. The method according to claim 1, wherein the core operating system function supports limited screen resolutions and color depth, the method further comprising:
    executing a second add-on module on the computer, the second add-on module expanding the support for screen resolutions and color depth relative to the core operating system function.

13. The method according to claim 1, wherein support for service packs, bug fixes, and patches is not included in an original purchase price of the core operating system function.

14. The method according to claim 13, further comprising allowing a user to selectively pay for support of bug fixes, service packs, and patches by installing a second add-on module on the computer.

15. The method according to claim 1, further comprising executing a second add-on module on the computer, the second add-on module providing the computer with support for Internet browsing.

16. The method according to claim 1, further comprising executing a second add-on module on the computer, the second add-on module providing the computer with support for peer-to-peer networking.

17. The method according to claim 1, further comprising executing a second add-on module on the computer, the second add-on module providing the computer with support for styles and user interface themes that allow a user to change an experience by personalizing an existing desktop environment on the computer via a new theme, the new theme being based on an existing theme and including:
    custom colors,
    screensavers,
    wallpapers,
    sounds,
    screen rendering options, and
    special effects.

18. The method according to claim 1, further comprising executing a bundle of add-on modules on the computer, the bundle of add-on modules providing the computer with support for:
    advanced sound support, game controller support, and increased video memory.

19. The method according to claim 1, the core operating system function further comprising functions for:
    system input/output,
    boot processes,
    file system support, and
    fundamental display capabilities.

* * * * *